US011997447B2

(12) United States Patent
Aurongzeb et al.

(10) Patent No.: US 11,997,447 B2
(45) Date of Patent: May 28, 2024

(54) METHOD AND APPARATUS FOR EARPIECE AUDIO FEEBACK CHANNEL TO DETECT EAR TIP SEALING

(71) Applicant: Dell Products, LP, Round Rock, TX (US)

(72) Inventors: Deeder M. Aurongzeb, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 160 days.

(21) Appl. No.: 17/870,735

(22) Filed: Jul. 21, 2022

(65) Prior Publication Data

US 2024/0031728 A1 Jan. 25, 2024

(51) Int. Cl.

| | |
|---|---|
| ***H04R 29/00*** | (2006.01) |
| ***G10K 11/178*** | (2006.01) |
| ***H04R 1/10*** | (2006.01) |

(52) U.S. Cl.

CPC ..... *H04R 1/1083* (2013.01); *G10K 11/17815* (2018.01); *G10K 11/17823* (2018.01); *H04R 1/1016* (2013.01); *H04R 1/1041* (2013.01); *H04R 2460/15* (2013.01)

(58) Field of Classification Search

CPC .. H04R 1/1083; H04R 1/1016; H04R 1/1041; G10K 11/17823; G10K 11/17815

See application file for complete search history.

(56) References Cited

U.S. PATENT DOCUMENTS

| | | | | |
|---|---|---|---|---|
| 2008/0159554 | A1 | 7/2008 | Sung | |
| 2011/0125063 | A1 * | 5/2011 | Shalon | A61B 5/4205 600/590 |
| 2011/0293103 | A1 | 12/2011 | Park | |
| 2016/0267899 | A1 | 9/2016 | Gauger | |
| 2018/0012584 | A1 | 1/2018 | Gauger | |
| 2018/0020281 | A1 | 1/2018 | Wurtz | |
| 2018/0047381 | A1 | 2/2018 | Gauger | |
| 2018/0114518 | A1 * | 4/2018 | Scanlan | H04R 1/1008 |
| 2019/0304429 | A1 | 10/2019 | Gauger | |
| 2021/0065673 | A1 | 3/2021 | Gauger | |
| 2021/0390941 | A1 * | 12/2021 | Lakshminarayanan | G10K 11/17881 |
| 2021/0409860 | A1 * | 12/2021 | Bean | G10K 11/17854 |
| 2022/0053259 | A1 | 2/2022 | Daley | |
| 2022/0167100 | A1 | 5/2022 | Kelly | |

* cited by examiner

*Primary Examiner* — Simon King

(74) *Attorney, Agent, or Firm* — Prol Intellectual Property Law, PLLC; H. Kenneth Prol

(57) ABSTRACT

An earpiece includes a housing including a sound output channel operatively coupled to a speaker formed within the housing. An ear canal feedback channel is formed extending alongside the sound output channel and operatively coupled to a microphone formed within the housing and a DSP operatively coupled to the microphone, the DSP including a voice activity detection module to detect a microphone audio data stream and discern between host audio data stream of audio played by the speaker and external ear canal noise captured in the microphone audio data stream at the microphone at the ear canal feedback channel. An audio processor receives the detected external ear canal noise and generate audio data descriptive of an opposite waveform to the detected external ear canal noise to playback and reduce the detected external ear canal noise.

20 Claims, 5 Drawing Sheets

METHOD AND APPARATUS FOR EARPIECE AUDIO FEEBACK CHANNEL TO DETECT EAR TIP SEALING

FIELD OF THE DISCLOSURE

The present disclosure generally relates to an earbud such as an earpiece. The present disclosure more specifically relates to optimizing audio quality at the earbud.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include peripheral devices such as wireless earbuds that provide audio signals to the earbuds for audio output to the user when the earbuds are worn.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
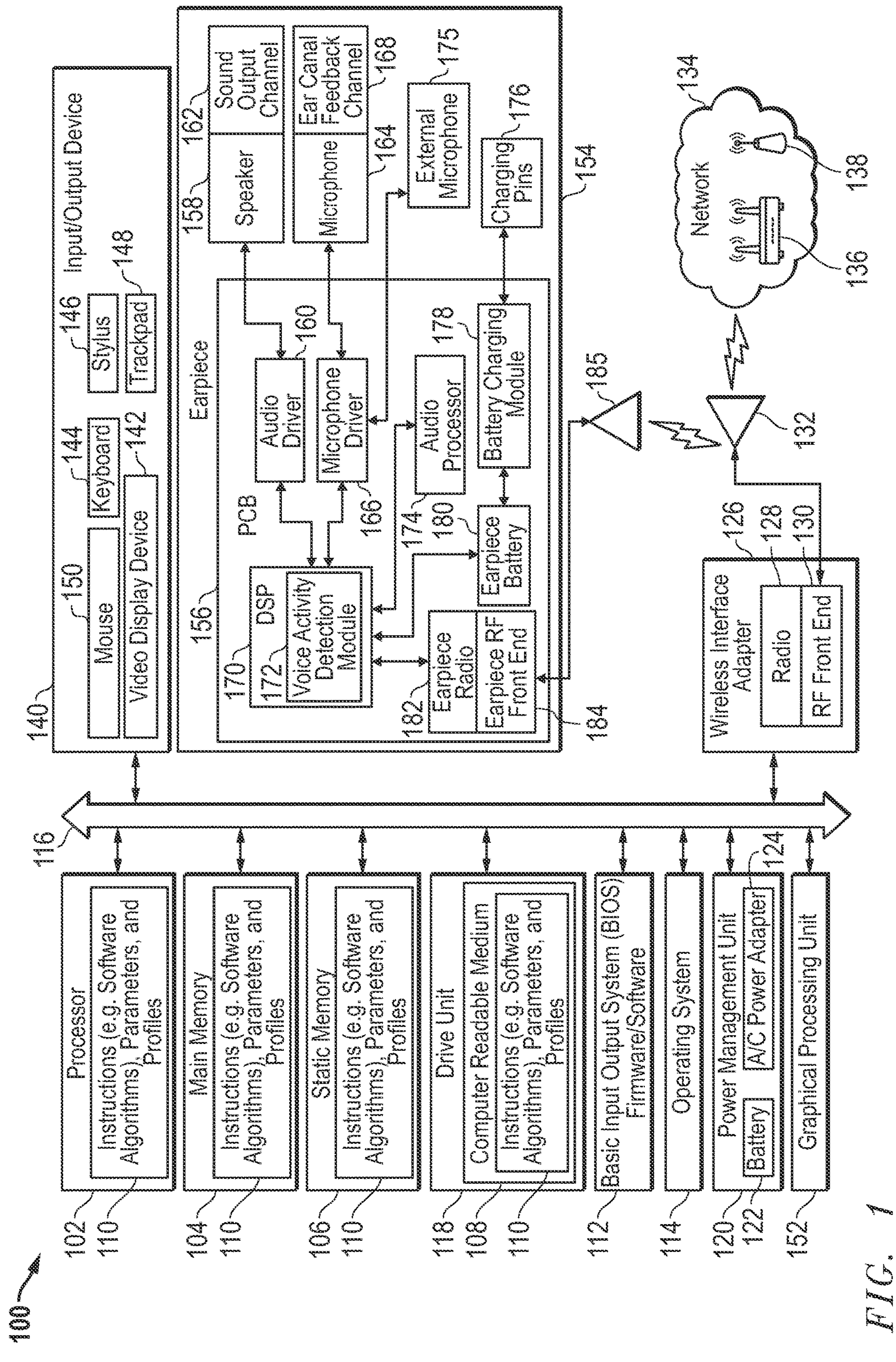
FIG. 1 is a block diagram of an information handling system with an earpiece according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems interface with various peripheral devices used to allow the user to interact with programs executed at the information handling system. Among these peripheral devices include audio output devices that provide audio to a user. These audio output devices include headphones that are placed over or within the user's ears. Those headphones that placed within the user's ear canal are called earbuds, earphones, earpiece, or in-ear headphones. For ease of discussion herein, those headphones that are placed, at least partially, within the ear canal of the user's outer ear are referred to as earpieces. The earpieces may include two earpieces with an earpiece being used for each of the user's ear. The use of two earpieces may allow for stereophonic sound (called herein "stereo") to be played at the earpieces adding a multi-directional or three-dimensional audible perspective. The two earpieces may be wirelessly coupled to one another wirelessly to one another wirelessly such that a primary earpiece may transfer an audio stream to a secondary earpiece in an embodiment. Either earpiece may be primary or secondary. In other embodiments, each earpiece may be wirelessly coupled in parallel to a host information handling system.

The earpieces may include an elongated portion that is capped with an ear tip or other ear canal plugs to cause the elongated portion to fit better inside the user's ear canal. However, these ear tips may not fit perfectly allowing external sound to enter the user's ear canal. Still further, some ear buds may not include an ear tip at all. Because of this, external sounds such as the wind blowing, car noises, and people chatting may degrade the music or other sounds provided by the ear buds. This may reduce the user experience.

The present specification describes and earpiece that includes a housing. This housing includes a sound output channel operatively coupled to a speaker formed within the housing. In an embodiment, the sound output channel may extend a distance into a user's ear when the earpiece is worn. The earpiece may further include an ear canal feedback channel extending alongside the sound output channel and operatively coupled to a microphone formed within the housing. In an embodiment, the ear canal feedback channel may also extend a distance into the user's ear when the earpiece is worn. The earpiece may further include a digital signal processor (DSP) operatively coupled to the microphone. In an embodiment, the DSP includes a voice activity detection module to detect an audio data stream input and discern between the audio data stream and external ear canal noise captured at the microphone at the ear canal feedback channel. The earpiece may further include, in an embodiment, an audio processor to receive the detected external ear canal noise captured at the microphone and create data descriptive of an opposite waveform with an inverted phase to the detected external ear canal noise to cancel the detected external ear canal noise. In this embodiment, the opposite waveform may be replicated at the speaker of the sound output channel. Further, the earpiece may include a microcontroller integrated circuit (IC) that may control volume and may increase the volume of an audio data stream to help mask detected external ear canal noise in some embodiments.

In an embodiment, the earpiece may include a speech/music discrimination (SMD) module to, via execution of a support vector machine (SVM), discriminate between speech and audio captured by the microphone. The SVM may be any type of supervised learning models with associated learning algorithms that analyze sound detected at the microphone and, via regressive analysis, provide a determination as to what part of the audio stream input from the microphone is music or other speaker-created sound and what part is external ear canal noise. The speaker-created sound may include music segments and speech segments that are intended to form part of the audio stream input to the speaker. The SVM may, in an example embodiment, discern between the speech and music segments intended for the user to hear and the external noise (e.g., people chatting, car noises, wind blowing, etc.) that may "leak" into the user's ear canal while wearing the earpiece.

In an embodiment, the processing resources associated with the operation of the SMD, SVM, and DSP, for example, may be located on the information handling system with the earpiece communicating with the information handling system to use these processing resources. The earpiece may, in an example embodiment, include a wireless radio used to communicate data to and from the information handling system to use the processing resources of the information handling system instead of or in addition to the processing resources of the earpiece.

In an embodiment, the earpiece may be one of two earpieces used by the user. Each earpiece may be inserted into an ear canal of the user. In an embodiment, the wireless radio may allow each earpiece to communicate with each other as well as provide stereo sound to add a multi-directional or three-dimensional audible perspective for the user. The earpieces may communicate with each other in a manner to relay an audio data stream from the information handling system to a first earpiece and from the first earpiece to a second earpiece in an example embodiment.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any other network devices such as an earpiece. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), nonvolatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as, various input and output (I/O) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an audio application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, an earpiece 154 that provides audio output to a user, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134 and, in an embodiment, to an interim edge storage management system 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an audio headset such as the earpiece 154 described herein, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, the earpiece 154 described in embodiments herein, and/or video display device 142 to the bus 116 in order for these devices to operate wirelessly with the information handling system 100. In a further aspect, the wireless interface adapter 126 may operate the two or more wireless links with a single, shared communication frequency band such as with the 5G or WiFi WLAN standards relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication including the earpiece 154 described herein. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may be operatively coupled to an earpiece 154. The earpiece 154 may include an earpiece radio 182, earpiece RF front end 184, and earpiece antenna earpiece antenna 185 that allows the earpiece 154 to be operatively coupled to the information handling system 100. In an embodiment, the wireless interface adapter 126 of the earpiece 154, via the earpiece antenna 185, may communicate with the information handling system 100 any wireless communication protocol including Bluetooth® communication as described herein. The earpiece radio 182 of the earpiece 154 may communication with the information handling system 100 via use of the antenna 132 on the wireless interface adapter 126 of the information handling system 100. Data may be transmitted between the earpiece 154 and information handling system 100 that includes, among other data, firmware or software updates and audio data. The audio data may include any type of audio including speech, music, and other audible noises. In an example embodiment, the information handling system 100 may execute a music streaming service application (e.g., Pandora®, Amazon Music®, Apple Music®, Spotify® Sirius XM®, among others), a media player software application (e.g., Windows Media Player®, VLC media Player®, iTunes®, Winamp®, MediaMonkey®, among others), or other software applications that can provide an audio stream input to the earpiece 154. The earpiece 154 may receive data descriptive of the audio stream input and process that data in order to activate a speaker 158 within the earpiece 154 for the user to hear the audio output.

The earpiece 154 may include an audio driver 160 used by a DSP 170 to provide input to the speaker 158. In an embodiment, the audio driver 160 may be any computer readable program code, executable by a processing device such as the DSP 170, and audio processor 174, a microcontroller unit (MCU) (not shown), or other processing resource such that describes the buffering and processing of the audio stream input for driving the speaker 158.

The speaker 158 may be operatively coupled to a sound output channel 162 formed into a housing of the earpiece 154. The sound output channel 162 may be a tubular channel extending away from the speaker 158 allowing sound produced by the speaker 158 to propagate down the tubular channel. The sound output channel 162 may extend away from a main portion of the housing of the earpiece 154 and may be sized, along with the ear canal feedback channel 168 described herein, to fit within an ear canal of a user. The length and diameter of the sound output channel 162 may be set to accommodate for an average size of a user's ear canal and may be covered with an ear tip (e.g., silicone cone attachment) to fit better within a given ear canal of the user. The sound output channel 162 is used as the mechanism to transmit the audio steam output (e.g., music, speech, etc.) to the user.

During operation, the earpiece antenna 185, earpiece radio frequency (RF) front end 184, and earpiece radio 182 may receive data descriptive of a host audio data stream from the information handling system 100. The data descriptive of a host audio data stream may be transmitted to the DSP 170 for the DSP 170 to communicate with an audio driver 160 or other processing resource such as an MCU to, with the audio processor 174, process the host audio data stream for actuating the speaker 158 as described herein.

In order to overcome external noises that leak into the ear canal during use of the earpiece 154, the earpiece 154 includes an ear canal feedback channel 168. The ear canal feedback channel 168 may also be a tubular channel that extends away from the main housing of the earpiece 154. The ear canal feedback channel 168 may run alongside or generally parallel to the sound output channel 162 and, in an embodiment, extend as far as the sound output channel 162. A microphone 164 is placed at a terminal end of the ear canal feedback channel 168 at the main housing of the earpiece 154. The microphone 164 is, in an embodiment, used to detect all sound within the user's ear canal. This sound may propagate from the ear canal, down the ear canal feedback channel 168, and received at the microphone 164. As described herein, the sounds detected by the microphone 164 may be a microphone audio data stream that includes the host audio data stream output from the speaker 158 as well as external noises that have leaked into the ear canal of the user. The DSP 170, audio processor 174, and voice activity detection module 172, may be used to separate the external ear canal noises from the host audio data stream output from the speaker 158 in order to provide compensating feedback targeting the external ear canal noise detected. Additionally, the audio processor 174 or other processing resource such as an MCU may increase the volume, in a limited way, to help cover the detected external ear canal noise.

During operation, the microphone 164 may send the detected sounds to computer readable program code describing a microphone driver 166 executed by the audio processor 174 or other processing resource such as an MCU on behalf of the DSP 170. The microphone driver 166 may send the processed sound data onto the DSP 170 for digital processing of the sound as described herein. In an embodiment, the DSP 170 may compare the data descriptive of an data audio stream output to the speaker 158 with the audio detected by the microphone 164, detect the waveform and sound characteristics of the external ear canal noise detected, and provide an opposite waveform with an inverted phase (e.g., out of phase with the detected external ear canal noise) to the detected external ear canal noise to cancel the detected external ear canal noise (e.g., destructive interference). In an embodiment, the opposite waveform may be replicated and mixed into the host audio data stream at the speaker 158 of the sound output channel 162. The audio processor 174 and audio driver 160 may operate as a mixer module to mix the opposite waveform with the host audio data stream to play at the speaker 158.

In an embodiment, the DSP 170 may execute a voice activity detection module 172. The voice activity detection module 172 may be computer readable program code that is executable by the DSP 170, the audio processor 174, or another processing resource such as an MCU on the earpiece 154 or associated with the information handling system 100 (e.g., processor 102, GPU 152, etc.). The voice activity detection module 172 may pre-process the detected sounds at the microphone 164 and separate the external ear canal noise (e.g., external conversations, car noises, wind) detected by the microphone 164 from the other sounds (e.g., music, speech, etc.). The voice activity detection module 172 executed by the DSP 170 may accomplish this by detecting the presence or absence of speech and differentiates that speech from non-speech sections of the detected audio from the microphone 164 such as those external ear canal noises. In an embodiment, the voice activity detection module 172 detects sudden changes in energy, spectral, or cepstral distances within the waveforms in the audio detected by the microphone 164. In an embodiment, one or more voice activity detection algorithms may be implemented to detect the presence or absence of certain speech components in the detected audio by the microphone 164. In an embodiment, an adaptive voice activity detection model, based upon signal energy and variance, may be implemented to provide classification (e.g., feature extraction) of segments of speech and silence within a particular detected audio output. In some embodiments, the voice activity detection algorithm may be implemented to create a filter that corresponds to patterns detected by a particular matched filter, for example.

In an embodiment, the voice activity detection module 172 may further execute a support vector machine that discriminate between speech and audio or noised captured by the microphone 164 and ear canal feedback channel 168. This may be done so that speech originating from the host audio data stream output at the speaker 158 and speech also detected by the microphone 164 at the ear canal feedback channel 168 may be characterized. Additionally, or alternatively, an external microphone 175 may be utilized by the earpiece 154 to capture a user's voice for audio communications. External microphone 175 may operate through a microphone driver 166 to provide detected voice audio data to DSP 170 and which may be transmitted via earpiece radio 182 to a host information handling system 100. The detection module 172 may further execute a support vector machine to discern between speech commands received at an external microphone 175 (e.g., via a virtual assistant command protocols) and other sounds capture by external microphone 175 or from the host audio data stream output at the speaker 158.

During a rule-based post processing, the external ear canal noise detected by the voice activity detection module 172 may be discerned so that speech content from an external source detected as external ear canal noise, for example, may be differentiated from speech that originated from the audio data stream output from the speaker 158. As described herein, the post processing of this data may further include, with the audio processor 174 and/or the DSP 170 or any other processing resource such as an MCU associated with the earpiece 154 or even the information handling system 100, creating an opposite waveform out of phase to the detected external ear canal noise. This compensating waveform is used to cancel the detected external ear canal noise. The opposite waveform, in an embodiment, is then replicated and mixed into the host audio data stream at the speaker 158 of the sound output channel 162 so that the user may hear more of the host audio stream output from the sound output channel 162 with less of any external ear canal noise. This process may be particularly effective where the external ear canal noise includes a constant waveform and frequency such as wind noises or human chatter in the background. Additionally, by detecting the sounds within the user's ear canal, those external ear canal noises detected within the ear canal are addressed rather than attempting to compensate for all external ear canal noise that may not actually leak into the user's ear canal when the earpiece 154 is worn.

The earpiece 154 may further include a PCB 156 onto which the components of the earpiece 154 are placed and metallic traces are formed to operatively couple these components. These components include the audio driver 160 (e.g., an application specific integrated circuit (ASIC) audio driver or an MCU, audio processor 174, processing resource executing firmware code or software code), the microphone 164, the microphone driver 166 (e.g., an ASIC microphone driver), the voice activity detection module 172 (e.g., an ASIC voice activity detection module), the audio processor 174, the earpiece radio 182 and earpiece RF front end 184, the earpiece antenna 185, and the DSP 170 and any MCU among other components described herein.

The earpiece 154 further includes an earpiece battery 180 used as a power source during operation of the earpiece 154. The earpiece battery 180 may be a rechargeable battery in an embodiment. The earpiece battery 180 may be operatively coupled to a battery charging module 178 (e.g., an ASIC formed on the PCB 156) that regulates how the earpiece battery 180 is charged. The battery charging module 178 may be operatively coupled to one or more charging pins 176. The charging pins 176 may pass through a portion of the housing of the earpiece 154 operatively coupling the PCB 156, battery charging module 178 and earpiece battery 180 to a charging station when the earpiece 154 has been stowed in a charging station. In an embodiment, this charging station may serve as a container to hold the earpiece 154 when not being used.

FIG. 1 shows a single earpiece 154. However, the present specification contemplates that the user may use two earpieces 154: a first earpiece 154 and a second earpiece 154. Each of these earpieces 154 may have similar components and function similarly as described herein. In an embodiment, the first and second earpiece 154 may communicate with each other, may communicate with the information handling system 100 individually, and/or may rely on one of the earpieces 154 to rely data to the other. Each earpiece 154 may fit into an ear of the user and may be sized and shaped to fit within a left or right ear in an embodiment.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
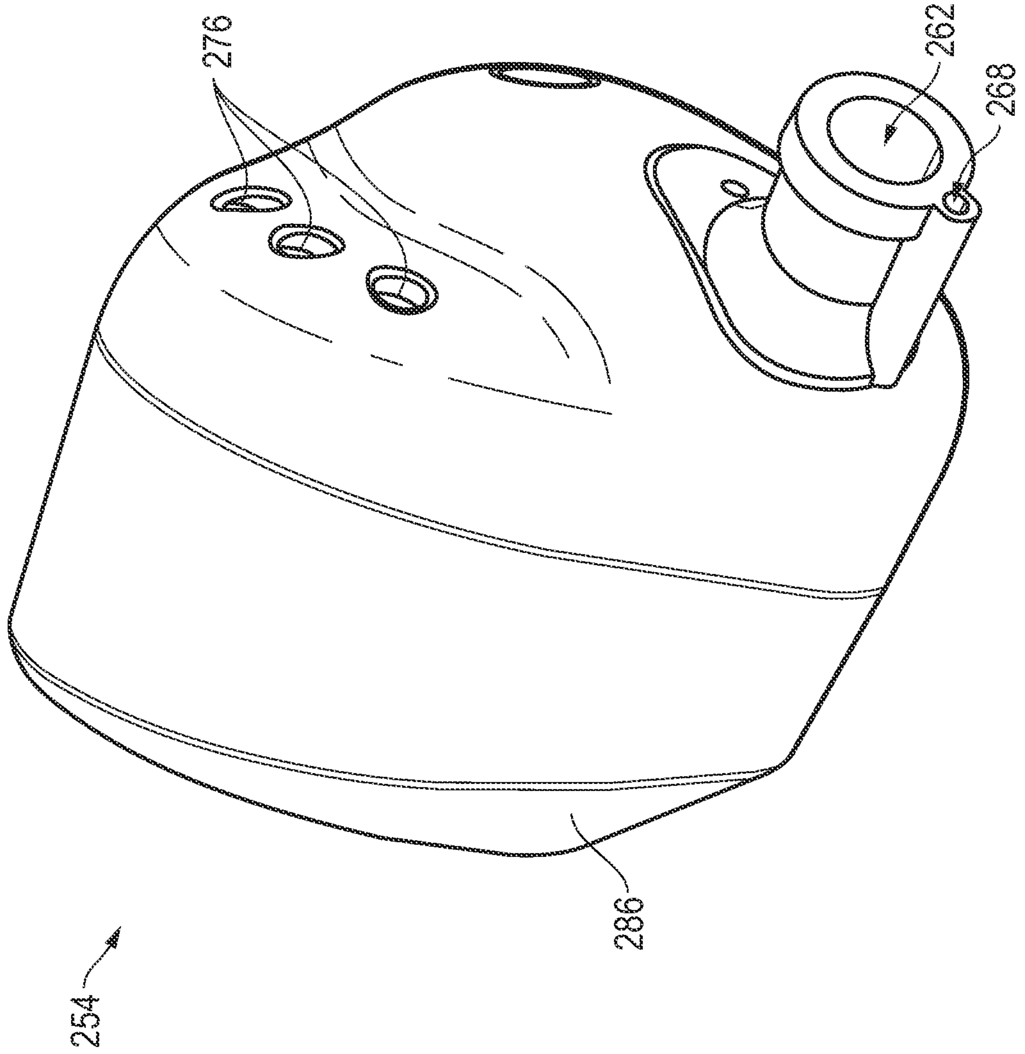
FIG. 2 is a graphic diagram of an earbud according to an embodiment of the present disclosure.

FIG. 2 is a graphic diagram of an earpiece 254 according to an embodiment of the present disclosure. As described herein, the earpiece 254 includes an earpiece housing 286 that houses those components of the earpiece 254 described herein. In an embodiment, the earpiece housing 286 may be made of light material such as injection molded plastic. In an embodiment, the earpiece 254 may be shaped to fit into the concha and eternal auditory meatus of the user's ear and within the user's anthelix, antitragus, and tragus so that the earpiece 254 can be held within the user's ear. Still further, although FIG. 2 shows a single earpiece 254, it is appreciated that a second earpiece 254, either for the user's right or left ear, may also be used for stereophonic sound to be played via the earpieces 254.

As shown, the earpiece housing 286 includes a sound output channel 262. The sound output channel 262 may be operatively coupled to a speaker within the earpiece housing 286. It is through this sound output channel 262 that the audio signal output from a received host audio data stream passes into the user's ear canal for the user to hear the music, speech, and other noises produced by the speaker. In an embodiment, the earpiece housing 286 or a portion of the earpiece housing 286 and sound output channel 262 may form a monolithic piece.

The earpiece housing 286 also includes an ear canal feedback channel 268. The ear canal feedback channel 268 may be operatively coupled to a microphone within the earpiece housing 286. It is through the ear canal feedback channel 268 that the microphone may detect all sounds within the ear canal of the user as a microphone media data stream. Among these sounds includes the audio signal output from the sound output channel 262 as well as external noises that may leak into the user's ear canal when the earpiece 254 is placed in the user's ear. In an embodiment, the ear canal feedback channel 268 may be placed alongside the sound output channel 262. In an embodiment, the distance that the sound output channel 262 extends into the user's ear canal may be as long as the distance that the sound output channel 262 extends into the user's ear canal. In an embodiment, both the sound output channel 262 and the ear canal feedback channel 268 may be fitted with a cover (not shown) for comfortable fit in a user's ear canal while still allowing audio to be played and sound detected.

FIG. 2 also shows one or more charging pins 276. The charging pins 276 may pass through a portion of the earpiece housing 286 operatively coupling the PCB, a battery charging module, and earpiece battery within the earpiece housing 286 to a charging station when the earpiece 254 has been stowed in a charging station. In an embodiment, this charging station may serve as a container to hold the earpiece 254 or a pair of earpieces 254 when they are not being used.

Figure 3:
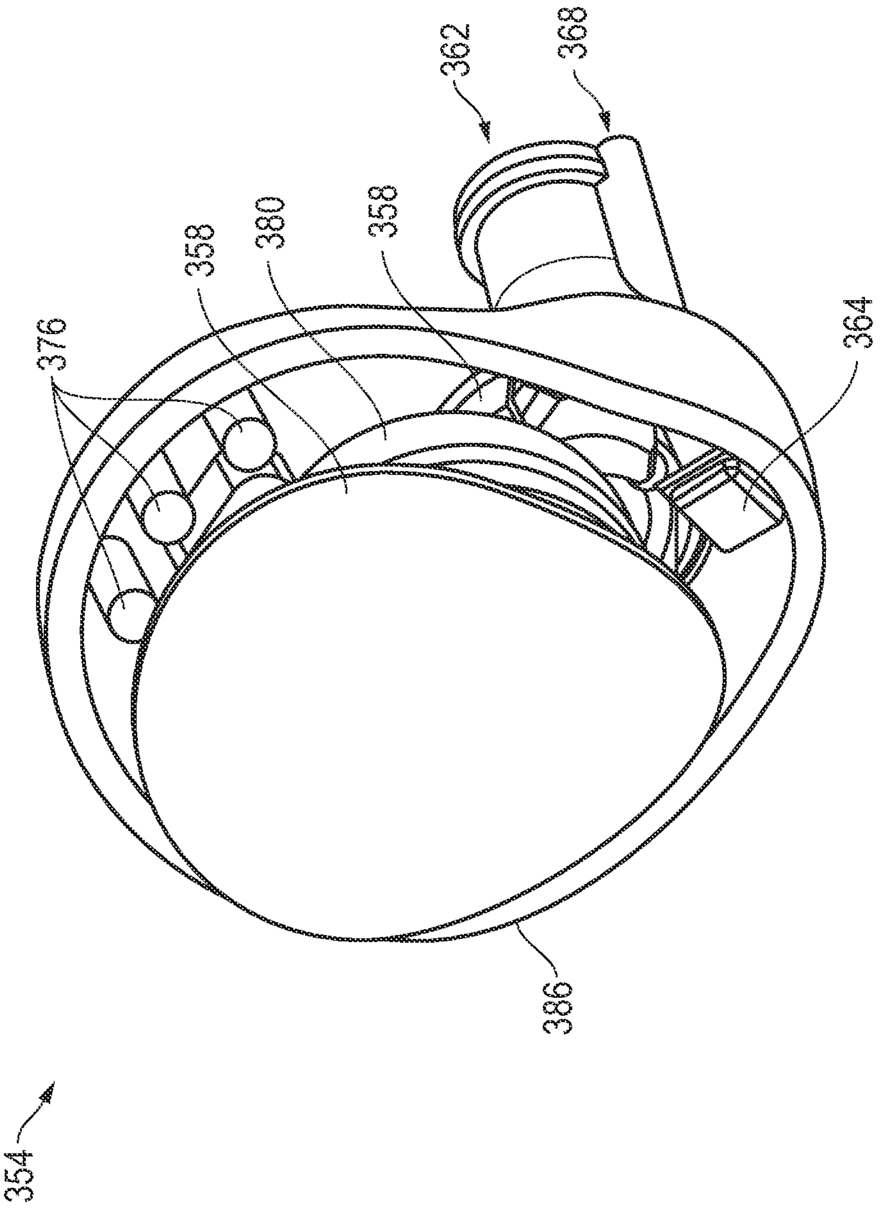
FIG. 3 is a graphic diagram of an earpiece according to another embodiment of the present disclosure.

FIG. 3 is a graphic diagram of an earpiece 354 according to another embodiment of the present disclosure. FIG. 3 shows a backside view of the earpiece 254 shown in FIG. 2 with a portion of an earpiece housing 386 removed. In the embodiment show in FIG. 3, an external-facing portion of the earpiece housing 386 has been removed to show portions of the interior of the earpiece housing 386. In an embodiment, the earpiece housing 386 may be made of light material such as injection molded plastic.

As described herein, the earpiece 354 includes a speaker 358 operatively coupled to the sound output channel 362. It is through this sound output channel 362 that the audio signal output emitted by the speaker 358 passes into the user's ear canal for the user to hear the music, speech, and other noises produced by the speaker 358. In an embodiment, the earpiece housing 386 or a portion of the earpiece housing 386 and sound output channel 362 may form a monolithic piece or may be several portions that may be coupled via a fastener, interference fit, or other structure in various embodiments. The speaker 358 may be operatively coupled to, for example, a DSP and audio driver on the PCB 356 via one or more electrical cables and electrical traces formed on the PCB 356. The PCB 356 may also include a battery, a battery charging module, and other power components used to drive the speaker 358.

The earpiece 354 may further include an ear canal feedback channel 368. The ear canal feedback channel 368 may also be a tubular channel that extends away from the main housing of the earpiece 354. The ear canal feedback channel 368 may run alongside or generally parallel to the sound output channel 362 and, in an embodiment, extend as far as the sound output channel 362. A microphone 364 is placed at a terminal end of the ear canal feedback channel 168 at the main housing of the earpiece 354. The microphone 364 is, in an embodiment, used to detect all sound within the user's ear canal. This sound may propagate from the ear canal, down the ear canal feedback channel 368, and received at the microphone 364. As described herein, the sounds detected by the microphone 364 in a microphone audio data stream may include the host audio stream output from the speaker 358 and sound output channel 362 as well as external noises that have leaked into the ear canal of the user. The DSP, audio processor, and voice activity detection module formed on the PCB 356 may be used to separate the external ear canal noises from the host audio stream output from the speaker 158 in order to provide compensating feedback targeting the external ear canal noise detected.

The earpiece 354 further includes one or more charging pins 376. The charging pins 376 may pass through a portion of the earpiece housing 386 of the earpiece 354 operatively coupling the PCB 356, a battery charging module (not shown) and an earpiece battery 380 to a charging station when the earpiece 354 has been stowed in a charging station. In an embodiment, this charging station may serve as a container to hold the earpiece 354 when not being used. During storage of the earpiece 354 into this container, the charging pins 376 may serve to operatively couple the charging container to the rechargeable earpiece battery 380 within the earpiece housing 386 to, by execution of the battery charging module (not shown), charge the earpiece battery 380 for later use by the user after receiving this charge. In an embodiment, the charging pins 376 are operatively coupled to the PCB 356 via an electrical wire.

Figure 4:
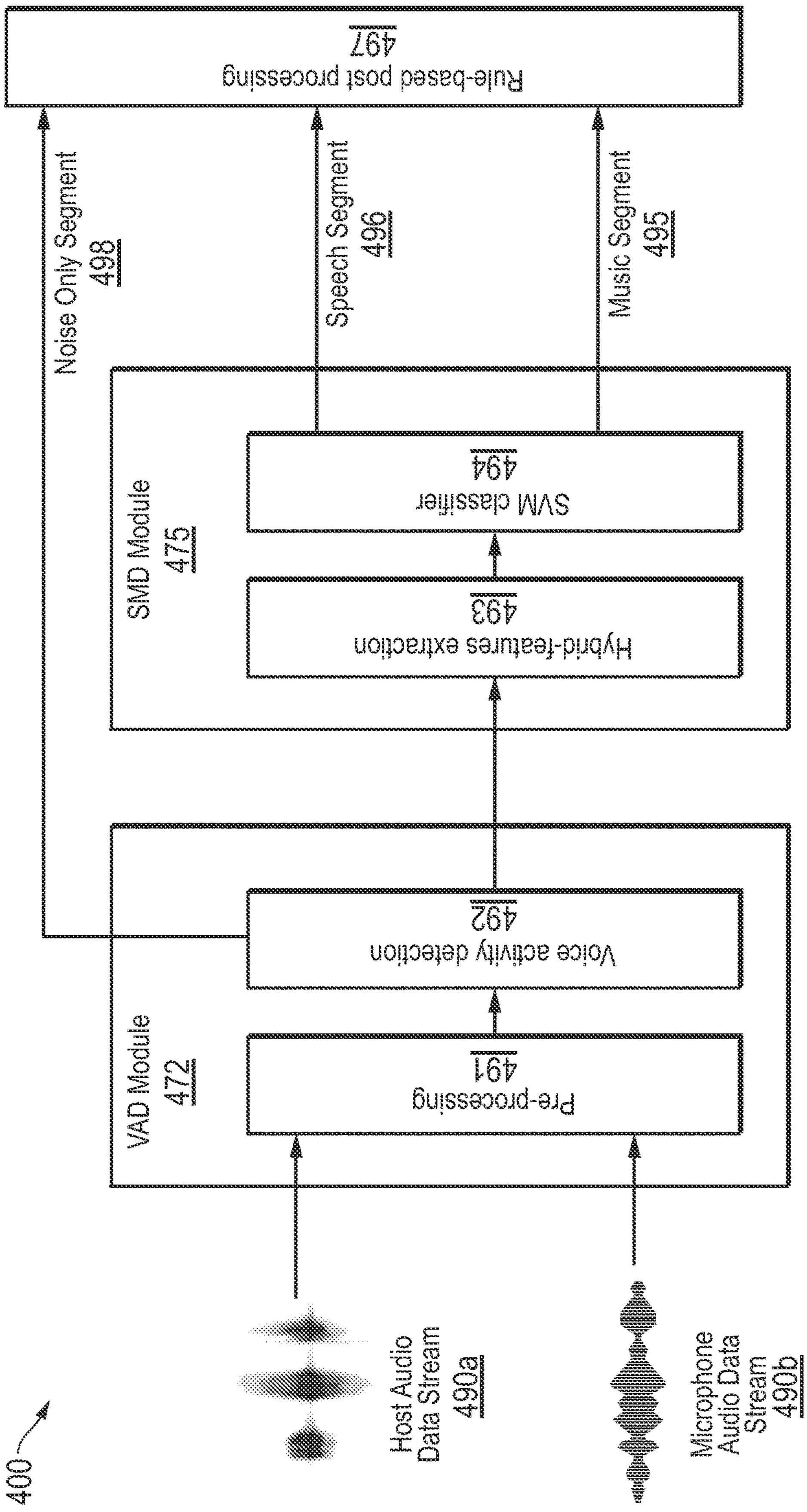
FIG. 4 is a block process diagram describing a method of classifying audio detected by a microphone of the earpieces according to an embodiment of the present disclosure.

FIG. 4 is a block process diagram describing a method 400 of classifying audio detected by a microphone of the earpieces according to an embodiment of the present disclosure. The method 400 includes receiving a host audio data stream 490*a* at a voice activity detection module 472. As described herein, an earpiece radio, front end, and antenna may be used to receive this host audio data stream 490*a* from the information handling system described herein. This host audio data stream 490*a* may be used to activate a speaker in order to provide the corresponding audio to the user. However, external ear canal noises may also be present within the user's ear canal with these external ear canal noises leaking into the user's ear canal. In order to compensate for the inclusion of these external ear canal noises, the earpiece includes an ear canal feedback channel and microphone to detect microphone audio data stream 490*b* input to the voice activity detection module 472.

As described herein, the voice activity detection module 472 may be, in an embodiment, computer readable program code executable by an audio processor MCU or other processing devices of the earpiece. In another embodiment, the voice activity detection module 472 may be firmware or hardware such as an ASIC that is accessible by the audio processor of the earpiece in order to execute the functions of the voice activity detection module 472 described herein.

The voice activity detection module 472 may pre-process 491 the host audio data stream 490*a* from the host information handling system from the microphone that may include feature extraction, classification, and noise removal among other processes. The feature extraction process may include, for example, discrimination between language, waveforms, frequencies, amplitude, and lengths. The voice activity detection module 472 may also engage in a voice activity detection 492 that classifies these features extracted from the host audio data stream 490*a*. With these extracted features being classified, the voice activity detection module 472 may execute a voice activity detection 492 process that scores these features in order to determine which portions of the sound received at the microphone via the ear canal feedback channel are external ear canal noises and which portions are the audio originally emitted by the speaker of the earpiece.

In an embodiment, the execution of the voice activity detection module 472 may execute a neural network that uses any type of machine learning classifier such as Bayesian classifier, a neural network classifier, a genetic classifier, a decision tree classifier, or a regression classifier among others. In an embodiment, the neural network may be in the form of a trained neural network; trained remotely and provided wirelessly to the voice activity detection module 472 of the earpiece. The trained neural network may be trained at, for example, a server located on the network operatively coupled to the information handling system and provided to the earpiece by the information handling system in a trained state. The training of the neural network may be completed by the server after receiving a set of audio parameters, extracted audio features, and other data from one or more information handling systems operatively coupled to the server. In an embodiment, the trained neural network may be a layered feedforward neural network having an input layer with nodes for gathered detected audio parameters, extracted audio features, and other data. For example, the neural network may comprise a multi-layer perceptron neural network executed using the Python® coding language. Other types of multi-layer feed-forward neural networks are also contemplated, with each layer of the multi-layer network being associated with a node weighting array describing the influence each node of a preceding layer has on the value of each node in the following layer. Via execution of this trained neural network by the voice activity detection module 472 during this voice activity detection 492 process, a noise only segment 498 is distinguished within the received host audio data stream 490*a* and separated from the remaining portions of the microphone audio data stream 490*b*. This noise only segment 498 may be the external noises that had leaked within the user's ear canal during use of the earpiece.

In an embodiment, a speech music discrimination module 475 may further distinguish between speech and music within the audio stream inputs that no longer includes the noise only segment 498. The speech music discrimination module 475, in an embodiment, may be computer readable program code that is executed by the audio processor of the earpiece. In another embodiment, the speech music discrimination module 475 is firmware or hardware such as an ASIC accessible by the audio processor of the earpiece to execute the processes described in this method 400.

The speech music discrimination (SMD) module 475 may discriminate between the music segments 495 and speech segments 496 of the audio by executing a hybrid-feature extraction 493 process using a support vector machine (SVM) classifier 494. The speech music discrimination module 475 may detect one-dimensional sub-band energy information and two-dimensional texture information parameters in an example embodiment. This allows the SVM classifier 494 to distinguish between the music segment 495 and speech segment 496 of any given section of the audio. In an embodiment, the SVM classifier 494 may import the one-dimensional sub-band energy information into this discriminative classifier to classify either the speech segment 496 or music segment 495 of the audio. Thus, the SMD and SVM may be used to distinguish speech and music for purposes of voice recognition applications and various multimedia applications.

The method 400 further includes a rule-based post processing 497. This rule-based post processing 497 may reduce possible errors of segmentation and classification during the previous processes. This smooths those music segments 495 may be a single audio frame among a plurality of speech segments 496, speech segments 496 that may be a single audio frame among a plurality of music segments 495, along with other outlying audio frames classified as either a music segment 495 or a speech segment 496. This process may be repeated any number of times until any classified music segment 495 or speech segment 496 remain consistent. It is appreciated that any processing methods used to separate noise-only segments 498 of the microphone audio data stream 490*b* received from the microphone from those music segments 495 and speech segments 496. The above processes of FIG. 4 may be used to generate a compensating waveform to the external ear canal noise to be mixed into and played as a portion of the host audio data stream 490*a* at the earpiece speaker to reduce or eliminate the ear canal noise according to various embodiments herein.

Figure 5:
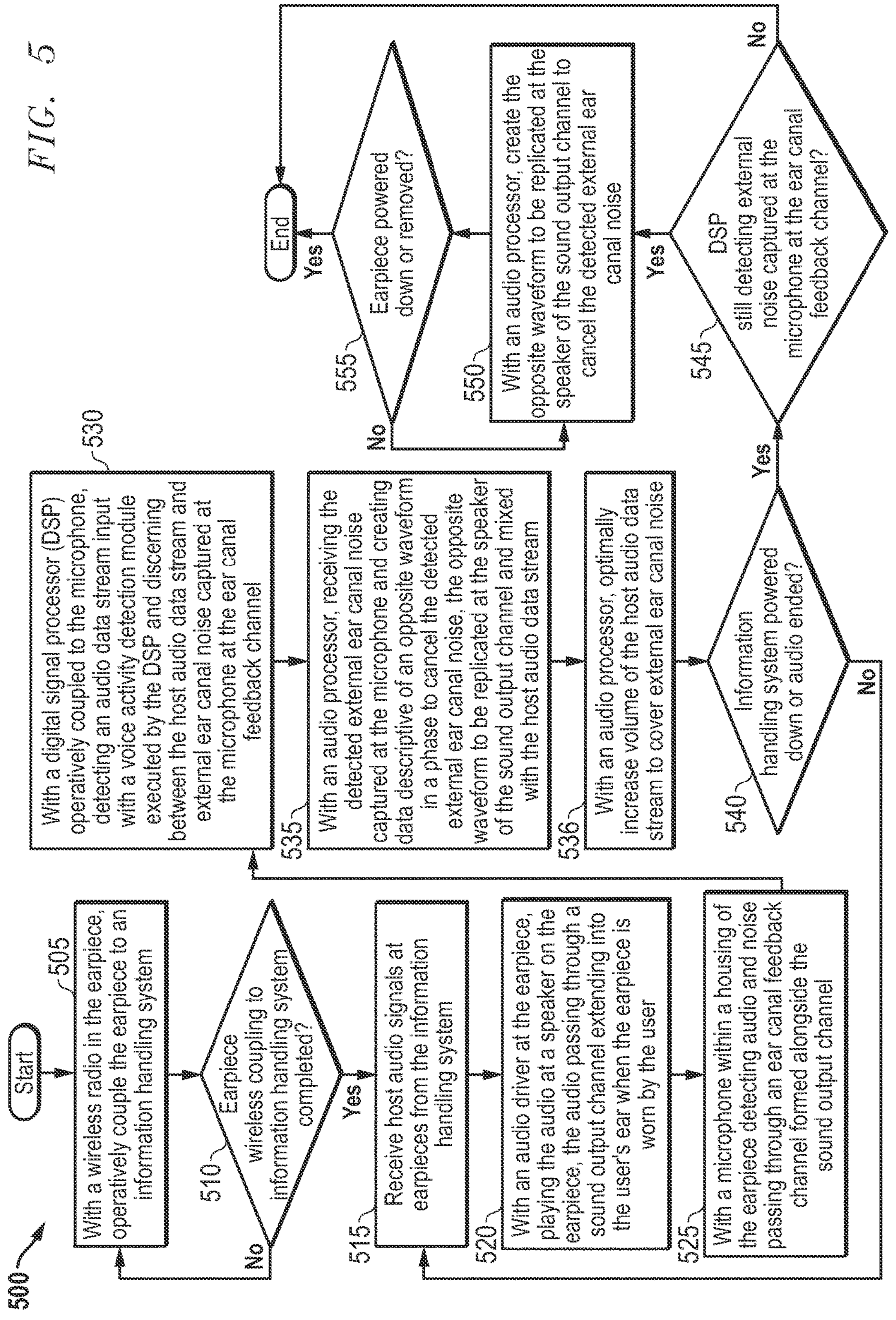
FIG. 5 is a flow diagram of a method of operating an earpiece according to an embodiment of the present disclosure.

FIG. 5 is a flow diagram of a method 500 of operating an earpiece according to an embodiment of the present disclosure. As described herein, the earpiece may be operatively coupled, for a time, to an information handling system in order to receive an audio signal from the information handling system. The method 500 includes, at block 505, operatively coupling the earpiece to the information handling system using an earpiece wireless radio system. In an embodiment, the earpiece wireless radio may include a radio frequency front end and antenna used to transceive data to and from a wireless interface adapter of the information handling system. In an example embodiment, the information handling system may execute a music streaming service application (e.g., Pandora®, Amazon Music®, Apple Music®, Spotify® Sirius XM®, among others), a media player software application (e.g., Windows Media Player®, VLC media Player®, iTunes®, Winamp®, MediaMonkey®, among others), or other software applications that can provide an audio stream input to the earpiece. The earpiece may receive data descriptive of the audio stream input and process that data in order to activate a speaker within the earpiece for the user to hear the audio output.

The earpieces may include two earpieces with an earpiece being used for each of the user's ear. The use of two earpieces may allow for stereophonic sound (called herein "stereo") to be played at the earpieces adding a multi-directional or three-dimensional audible perspective. The two earpieces may be wirelessly coupled to one another wirelessly to one another wirelessly such that a primary earpiece may transfer an audio stream to a secondary earpiece in an embodiment. Either earpiece may be primary or secondary. In other embodiments, each earpiece may be wirelessly coupled in parallel to a hose information handling system.

The method 500 may include determining if the wireless coupling of the earpiece to the information handling system has been completed at block 510. In order to determine whether the earpiece has been operatively coupled to the information handling system may include inquiring or discovering the earpiece at the information handling system (detecting a pairing frequency from the headphones), paging or forming the connection between the earpiece and the information handling system via knowledge of each devices' address or other identifying information, or activating pairing or auto-pairing procedures such as with Bluetooth® or BLE, connecting the devices by engaging in active transmission and reception of data between the earpiece and information handling system. The paging process may be an indicator that the coupling of the information handling system and earpiece has been completed. Where it is determined that the operative coupling between the information handling system and the earpiece is not completed, the method 500 may return to block 505 as described herein.

Where it has been determined, either by the information handling system or the earpiece, that the earpiece has been operatively coupled to the information handling system (e.g., via a Bluetooth® connection) in a wireless link, the method 500 continues to block 515 with receiving host audio data stream at the earpiece from the information handling system. As described herein, these audio signals may include data describing music, speech or other sounds that are to be used to drive the speaker in the earpiece. In an embodiment, this host audio data stream may be re-transmitted or otherwise shared with a second earpiece as described herein.

The method 500 may continue at block 520 with playing the host audio data stream at the speaker on the earpiece with an audio driver (e.g., executed by an audio processor, MCU, or other processing resource). This causes the sounds produced by the speaker to pass through a sound output channel. The sound output channel may be a tubular channel extending away from the speaker allowing sound produced by the speaker to propagate down the tubular channel. The sound output channel may extend away from a main portion of the housing of the earpiece and may be sized, along with the ear canal feedback channel described herein, to fit within an ear canal of a user. The length and diameter of the sound output channel may be set to accommodate for an average size of a user's ear canal and may be covered with an ear tip (e.g., silicone cone attachment) to fit better within a given ear canal of the user. The sound output channel is used as the mechanism to transmit the audio steam output (e.g., music, speech, etc.) to the user's eardrum. During operation of the speaker, an audio processor of the earpiece may execute an audio driver to interface with the speaker as described herein.

The method 500 may further include detecting audio and noise passing through an ear canal feedback channel formed alongside the sound output channel using a microphone within the housing of the earpiece at block 525. The ear canal feedback channel may be a tubular channel that extends away from the main housing of the earpiece. The ear canal feedback channel may run alongside or generally parallel to the sound output channel and, in an embodiment, extend as far as the sound output channel. A microphone is placed at a terminal end of the ear canal feedback channel at the main housing of the earpiece. The microphone is, in an embodiment, used to detect all sound within the user's ear canal as a microphone audio data stream. This sound may propagate from the ear canal, down the ear canal feedback channel, and received at the microphone. As described herein, the sounds detected by the microphone as a microphone audio data stream may include the host audio data stream output from the speaker as well as external noises that have leaked into the ear canal of the user. These external noises may include speech (e.g., distant people speaking), wind, and other noises that were not part of the audio output from the speaker.

The method 500 further includes, at block 530, detecting an audio data stream input with a voice activity detection module executed by the DSP and discerning between the host audio data stream and external ear canal noise captured in a microphone audio data stream at the microphone at the ear canal feedback channel with the DSP operatively coupled to the microphone. This process includes the voice activity detection module executing a neural network that uses any type of machine learning classifier such as Bayesian classifier, a neural network classifier, a genetic classifier, a decision tree classifier, or a regression classifier among others. In an embodiment, the neural network may be in the form of a trained neural network; trained remotely and provided wirelessly to the voice activity detection module of the earpiece. The trained neural network may be trained at, for example, a server located on the network operatively coupled to the information handling system and provided to the earpiece by the information handling system in a trained state. The training of the neural network may be completed by the server after receiving a set of audio parameters, extracted audio features, and other data from one or more information handling systems operatively coupled to the server. In an embodiment, the trained neural network may be a layered feedforward neural network having an input layer with nodes for gathered detected audio parameters, extracted audio features, and other data. For example, the neural network may comprise a multi-layer perceptron neural network executed using the Python® coding language. Other types of multi-layer feed-forward neural networks are also contemplated, with each layer of the multi-layer network being associated with a node weighting array describing the influence each node of a preceding layer has on the value of each node in the following layer. Via execution of this trained neural network by the voice activity detection module during this voice activity detection process, a noise only segment is distinguished within the received host audio stream input and separated from the remaining portions of the microphone audio data stream. This noise only segment may be the external noises that had leaked within the user's ear canal during use of the earpiece.

In an embodiment, a speech music discrimination module may further distinguish between speech and music within the host audio data stream input that no longer includes the noise only segment. The speech music discrimination module, in an embodiment, may be computer readable program code that is executed by the audio processor of the earpiece. In another embodiment, the speech music discrimination module is firmware or hardware such as an ASIC accessible by the audio processor of the earpiece to execute the processes described in this method.

The speech music discrimination (SMD) module may discriminate between the music segments and speech segments of the audio by executing a hybrid-feature extraction process using a support vector machine (SVM) classifier. The speech music discrimination module may detect one-dimensional sub-band energy information and two-dimensional texture information parameters in an example embodiment. This allows the SVM classifier to distinguish between the music segment and speech segment of any given section of the audio. In an embodiment, the SVM classifier may import the one-dimensional sub-band energy information into this discriminative classifier to classify either the speech segment or music segment of the audio.

The method 500 may include, at block 535, receiving the detected external ear canal noise captured at the microphone and creating data descriptive of an opposite waveform with an inverted phase to the detected external ear canal noise to cancel or reduce the detected external ear canal noise, the opposite waveform to be replicated at the speaker of the sound output channel using the audio processor. The opposite waveform, in an embodiment, is then replicated at the speaker of the sound output channel so that the user may hear only or a greater portion of the host audio data stream output from the sound output channel and mixed with the host audio data stream with less of any external ear canal noise. This process may be particularly effective where the external ear canal noise includes a constant waveform and frequency such as wind noises or human chatter in the background. Additionally, by detecting the sounds within the user's ear canal, those external noises detected within the ear canal are addressed rather than attempting to compensate for all external noise that may not actually leak into the user's ear canal when the earpiece is worn.

The method 500 includes determining whether the information handling system has been powered down or caused transmission or reception of an active audio data stream at block 540. The powering down of the information handling system may stop audio data from being transmitted to the earpiece. Otherwise, the information handling system may still be operating but no transmitting audio data in an embodiment. The user, however, may still wear the earpieces and may desire to reduce external ear canal noises. Where the information handling system is not powered down at block 540, the method may proceed to block 515 with earpiece receiving further audio data signals via the interactions between the respective wireless radios of the information handling system and earpiece or earpieces as described herein.

Where the information handling system has been powered down or otherwise ceases to transmit audio data at block 540, the method 500 may optionally continue to block 545 in some embodiments. At block 545, the method 500 includes determining whether the DSP is still detecting external ear canal noise captured at the microphone at the ear canal feedback channel. It is appreciated that although the earpiece is not receiving audio data from the information handling system (or is no longer operatively coupled to the information handling system), the DSP may still prevent external ear canal noises from being heard by the user. These external ear canal noises may be detectable by the user where no audio is being output by the speaker and where the DSP does not generate an opposite waveform to be replicated at the speaker of the sound output channel. Where the DSP is not detecting external ear canal noise captured at the microphone at the ear canal feedback channel, the method 500 may proceed to block 555 to determine if the earpiece is powered down or removed. Where the DSP is still detecting external ear canal noise captured at the microphone at the ear canal feedback channel at block 545, the method 500 may proceed to block 550 with the DSP creating the opposite waveform to be replicated at the speaker of the sound output channel to cancel the detected external ear canal noise by executing the audio processor as described herein. Again, this allows a user to, although not receiving audio at the speaker, still reduce any external ear canal noises detected by the microphone via the ear canal feedback channel and within the user's ear canal.

The method 500 may also include, at block 555, determining whether the earpiece has been powered down or removed form a user's ear canal in some embodiments. The powering down of the earpiece may include removing them and placing the earpieces within a charging container as described herein which causes the processes and hardware to be shut down in the earpiece except those processes and hardware associated with charging the earpiece battery. Alternatively, the powering down of the earpiece may include the actuation of a button on the earpiece that shuts the earpiece down. Where the earpiece has not been shut down, the method 500 may continue to block 550 with continuing to create the opposite waveform to cancel out external ear canal noises that have leaked into the user's ear canal. Where the earpiece has been shutdown at block 555, the method may end.

The blocks of the flow diagrams of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An earpiece comprising:

a housing comprising:

a sound output channel operatively coupled to a speaker formed within the housing, the sound output channel extending into a user's ear when the earpiece is worn;

a speaker to play audio of a host audio data stream received at the earpiece;

an ear canal feedback channel extending alongside the sound output channel and operatively coupled to a microphone formed within the housing, the ear canal feedback channel extending into the user's ear when the earpiece is worn;

a digital signal processor (DSP) operatively coupled to the microphone, the DSP including a voice activity detection module to detect a microphone audio data stream and discern between host audio data stream of audio played by the speaker and external ear canal noise captured in the microphone audio data stream at the microphone at the ear canal feedback channel; and an audio processor to receive the detected external ear canal noise and generate audio data descriptive of an opposite waveform to the detected external ear canal noise to playback and reduce the detected external ear canal noise, the opposite waveform to be replicated at the speaker of the sound output channel with the host audio data stream.

2. The earpiece of claim 1 further comprising:

a speech/music discrimination (SMD) module to, via execution of a support vector machine, discriminate between speech and music received at an external microphone on the earpiece and between speech and noise audio captured by the microphone at the ear canal feedback channel formed within the housing in the microphone audio data stream.

3. The earpiece of claim 1 further comprising:

a wireless radio to operatively couple the earpiece to a processing device of an information handling system wherein the wireless radio transmits data associated with the external ear canal noise captured by the microphone and, along with the audio processor of the earpiece, create data descriptive of the opposite waveform.

4. The earpiece of claim 1 further comprising:

the DSP increases the volume of the host audio data stream by an amount relative to the detected external ear canal noise to mask the ear canal noise upon detection of the ear canal noise.

5. The earpiece of claim 1 further comprising:

a printed circuit board (PCB) to hold the DSP and operatively couple the DSP to the microphone and the speaker.

6. The earpiece of claim 1 further comprising:

one or more charging pins operatively coupled to a battery charging module; and the battery charging module to modulate a current at a voltage to charge a rechargeable battery within the earpiece.

7. The earpiece of claim 1 further comprising:

an earpiece radio to wirelessly couple the earpiece to a second earpiece, the earpiece and the second earpiece providing stereo audio to the user.

8. A wireless audio headset comprising:

a first earpiece;

a second earpiece;

a first wireless radio of the first earpiece to transmit a received host audio data stream to a second wireless radio on the second earpiece;

the first and second earpiece each including:

a housing comprising:

a sound output channel operatively coupled to a speaker formed within the housing, the sound output channel extending into a user's ear when the earpiece is worn, the speaker to play audio of the host audio data stream in the sound output channel;

an ear canal feedback channel extending alongside the sound output channel and operatively coupled to a microphone formed within the housing, the ear canal feedback channel extending into the user's ear when the earpiece is worn;

a digital signal processor (DSP) operatively coupled to the microphone, the DSP including a voice activity detection module to detect a microphone audio data stream and discern between the host audio data stream and external ear canal noise captured at the microphone at the ear canal feedback channel in the microphone audio data stream; and an audio processor to receive the detected external ear canal noise captured at the microphone in the microphone audio data stream and create data descriptive of an opposite waveform out of phase to the detected external ear canal noise to cancel the detected external ear canal noise, the opposite waveform to be replicated and mixed into the host audio data stream at the speaker of the sound output channel.

9. The wireless audio headset of claim 8 further comprising:

a speech/music discrimination (SMD) module on each of the first earpiece and second earpiece to, via execution of a support vector machine, discriminate between speech and audio captured by an external microphone for voice command recognition.

10. The wireless audio headset of claim 8 further comprising:

the first wireless radio on the first earpiece and the second wireless radio on the second earpiece to operatively couple each earpiece to a processing device of an information handling system wherein the wireless radio transmits data associated with the external ear canal noise captured by the microphone and, along with the audio processor of each earpiece, creates data descriptive of the opposite waveform.

11. The wireless audio headset of claim 8 further comprising:

the DSP increases the volume of the host audio data stream by an amount relative to the detected external ear canal noise to mask the ear canal noise upon detection of the external ear canal noise.

12. The wireless audio headset of claim 8 further comprising:

A printed circuit board (PCB) formed within each of the first earpiece and second earpiece to hold the DSP and operatively couple the DSP to the microphone and the speaker in each of the first earpiece and the second earpiece.

13. The wireless audio headset of claim 8 further comprising:

each of the first earpiece and second earpiece including one or more charging pins operatively coupled to a battery charging module; and the battery charging module to modulate a current at a voltage to charge a rechargeable battery within the earpiece.

14. The wireless audio headset of claim 8 further comprising:

a speech/music discrimination (SMD) module on each of the first earpiece and second earpiece to, via execution of a support vector machine, discriminate between speech captured by an external microphone of each of the first earpiece and the second earpiece and speech and audio captured by the microphone in the microphone audio data stream.

15. A method of operating an earpiece comprising:

with an audio driver, providing a received host audio data stream output to a speaker to emit audio from a sound output channel operatively coupled to a speaker and formed as an extension of an earpiece housing, the sound output channel extending into a user's ear when an earpiece is worn;

with a microphone formed within an ear canal feedback channel extending alongside the sound output channel, detecting audio and ear canal noise within an ear canal of the user as a microphone audio data stream;

with a digital signal processor (DSP) operatively coupled to the microphone, detecting the microphone audio data stream with a voice activity detection module executed by the DSP and discerning between the host audio data stream and external noise captured at the microphone in the microphone audio data stream at the ear canal feedback channel; and with an audio processor, receiving the detected external ear canal noise captured at the microphone and creating data descriptive of an opposite waveform out of phase to the detected external ear canal noise to reduce the detected external ear canal noise, the opposite waveform to be replicated and mixed with the host audio data stream at the speaker of the sound output channel.

16. The method of claim 15 further comprising:

with a speech/music discrimination (SMD) module to, via execution of a support vector machine by the DSP, discriminate between speech and audio captured by the microphone.

17. The method of claim 15 further comprising:

with a wireless radio operatively coupled in the earpiece, operatively coupling the earpiece to a processing device of an information handling system wherein the wireless radio transmits data associated with the external noise captured by the microphone in the microphone audio data stream and, along with the audio processor of the earpiece, creates data descriptive of the opposite waveform.

18. The method of claim 15 further comprising:

with the DSP, increasing the volume of the host audio data stream by an amount relative to the detected external ear canal noise to mask the ear canal noise upon detection of the external ear canal noise.

19. The method of claim 15 further comprising:

the earpiece including a printed circuit board (PCB) to hold the DSP and operatively couple the DSP to the microphone and the speaker.

20. The method of claim 15 further comprising:

with one or more charging pins operatively coupled to a battery charging module modulating a current at a voltage to charge a rechargeable battery within the earpiece.

* * * * *